United States Patent Office 2,845,734
Patented Aug. 5, 1958

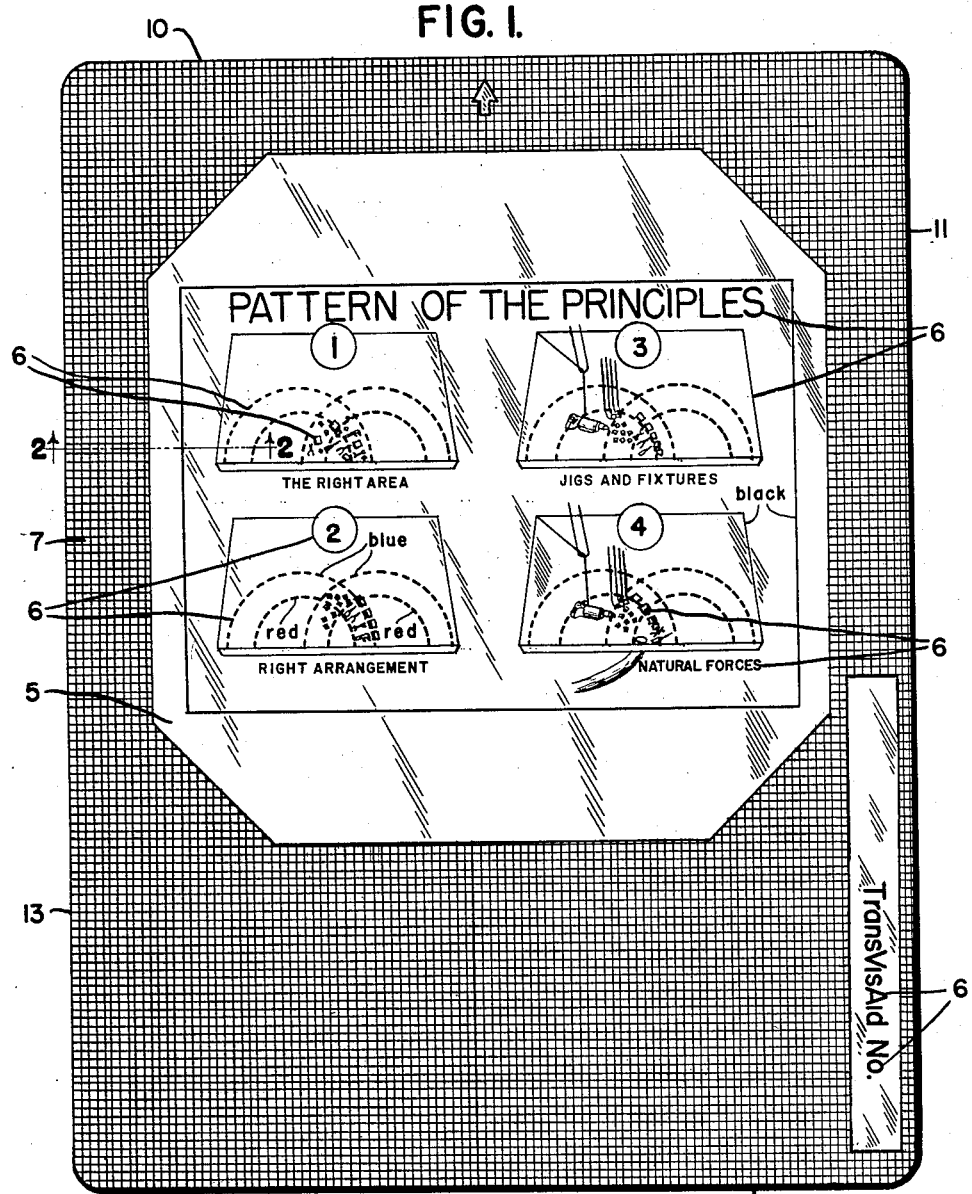
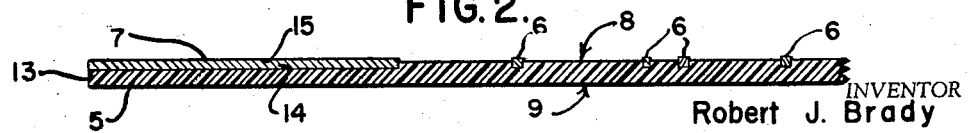

2,845,734

PROJECTION SLIDES AND MATERIAL FOR THE PREPARATION THEREOF

Robert J. Brady, College Park, Md., assignor to Visual Slide Company, Washington, D. C., a corporation of the District of Columbia Application June 3, 1955, Serial No. 512,985

8 Claims. (Cl. 40—158)

This invention relates to projection slides and materials for the preparation of such slides.

Modern projection slides are generally of hardened synthetic plastics formed into thin transparent sheets and coated with a photographic emulsion containing indicia and border frames of adhering applied material or materials. Such indicia and border frames may be provided by painting, stenciling, printing, inking, pasting or otherwise applying the material or materials to the surface or surfaces of the sheets. However, it has been discovered that all of these methods are objectionable in that the material or materials of the indicia and/or border frames are subject to erasure to some degree and to crazing, chipping, peeling, fading, cracking or creeping and may even tend to buckle, shrink or warp the sheet, particularly in the area adjacent the border frame or where there are areas of applied material or materials providing indicia. And unless the sheets are excessively thin, the applied indicia tends to cause parallax, such as when the slides are employed with apparatus such as overhead type projectors, which have come into use only within recent years. Inlays in plastic sheets are known, generally in the nature of colored foils but such inlays would project as black areas and are subject to some of the objections to surface coatings as described above, particularly shrinking and warping. As for engraving and filling the recesses with ink and the like, this has not proven practical in the manufacture of projection slides.

An important object of this invention is to provide a self-contained projection slide containing indicia-forming material which is integrated or bonded with the body of the slide.

Another important object is to provide a self-contained projection slide containing a border frame of material which is integrated or bonded with the body of the slide.

In addition an important object is to provide a projection slide in which the indicia-forming material contained thereby will not rub off the body of the slide.

Another important object is to provide a projection slide containing a border frame of material which will not rub off of the slide.

An additional very important object is to provide a self-contained projection slide containing indicia-forming and/or border frame material which is free of bubbles.

A further important object is to provide a substantial projection slide for overhead type projections which slide is practically free of parallax.

Furthermore, an important object is to provide a projection slide in which the material of the indicia thereon will not craze, chip, peel, fade, crack nor creep.

Another important object is to provide a projection slide having a border frame of material which will not chip, peel, fade, craze nor creep.

In addition, a major object is to provide a projection slide which will not buckle nor warp even when containing a large area of indicia forming and/or border frame forming material or materials.

A still further major object is to provide a composition of matter or material adapted for use in providing the indicia and/or border frames of projection slides.

Other objects and advantages of this invention will be apparent during the course of the following detailed description of the invention, taken in connection with the accompanying drawing, forming a part of this disclosure, and in which drawing:

Fig. 1 is a plan view of a projection slide embodying the invention.

Fig. 2 is a fragmentary vertical section, substantially on the line 2—2 of Fig. 1.

In the drawing, wherein for the purpose of illustration is shown a preferred embodiment of the invention and wherein similar reference characters designate like parts in the several views, the projection slide comprises a carrier or body 5 containing material 6 to provide indicia bonded thereto or integrated therewith and material 7 to provide a border frame bonded to the carrier or body 5 or integrated therewith.

The carrier or body 5 is shown as a substantially transparent sheet or plate with opposite faces 8 and 9. In the example shown, there are a plurality of edges 10, 11, 12 and 13. The desirable characteristics of the sheet are that it be self-sustaining, flexible and non-fragile. By transparent I do not mean that it must be colorless, but is must be of light rays-transmitting material. I have discovered that cast cellulose ester sheets of cellulose acetobutyrate, manufactured by the Eastman Kodak Company, Rochester, New York, under the name of "Kodapak" are useful and the sheets having the designation "Kodapak II," are preferred.

It is desirable, of course, that the faces 8 and 9 be smooth for good projection.

The gauge of the carrier or body is preferably .005 to .060.

For the material 6 and/or 7 I prefer to employ a composition of matter of my own of coloring matter, a compound from the group consisting of ethylene glycol monobutyl ether (commonly known as butyl Cellosolve) and butyl lactate, castor oil, and a combined solvent, vehicle and thinner.

The preferred formula is:

| | | |
|---|---|---|
| Coloring matter | lb | ¼ |
| Butyl Cellosolve | oz | 10 |
| Castor oil | drops | 15 |
| Solvent and vehicle | oz | 2 | with the above being by avoirdupois weights.

The coloring matter is preferably a dye which may be a spirit-soluble dye such as the well-known Colcofast Red-B, Methyln Blue-B, Spirit Soluble Fast Yellow-G and Malachite Green. The above formula may be varied in the amount of dye employed, since shades will entail the use of less dye as desired.

I prefer butyl Cellosolve to butyl lactate although the latter may be employed in the same weight as butyl Cellosolve.

The castor oil may be the ordinary first cold pressed oil and the solvent and vehicle is preferably lacquer such as that known as "Naz-Dar No. 4820 Clear Decal Lacquer," manufactured by the Naz-Dar Co., Chicago 10, Ill.

In practical compounding the material 6 and/or 7 I add the butyl Cellosolve and the castor oil to the dye and mix thoroughly in a suitable receptacle (as a glass gallon jar). The jar is covered and the mixture allowed to remain covered for approximately four hours, with occasional shakings (about one hour apart) of the receptacle. Thereupon the cover is removed from the receptacle and the contents allowed to stand, uncovered, for approximately twenty-four hours. Thereafter the lacquer is added to the mixture and mixed therewith whereupon the mixture provides a stock solution to which additional lacquer may be added to thin. If all of these steps are not carried out as above, and the castor oil is omitted, the mixture will cause bubbles in the finished product to which it is applied, and thus render the finished product unacceptable.

I am aware that butyl lactate has been suggested, in small weights, as a thinner in surface-coating inks but my composition of matter is not a surface coating ink and the lactate is not a thinner as is obvious. Lactates have also been employed in silk screen printing ink and in inks for printing directly on rubber or paper but they are only surface-printing inks. I am also aware that butyl Cellosolve is used in printing textiles.

On the other hand, my composition of matter is not a mere surface-coating ink, nor a recess-printing ink or a textile-printing ink but, instead, it bonds or integrates with the material of the carrier or body 5, and cannot be separated therefrom by such expedients as rubbing, or flexing the carrier or body, and it will not shrink while drying. Neither will it spread over the face upon which it is applied.

The material may be applied by silk screen printing methods, employing a suitable stencil or stencils (a separate stencil for each color employed), by lightly contacting a smooth face of the carrier or body with the material. It will then migrate into the body of the carrier and become bonded or integrated therewith to provide a sub-surface portion 14 and an above surface portion 15, as is shown in Fig. 2, both being structurally alike. Generally an hour delay is allowed between runs to allow for bonding or integrating and drying.

As may be appreciated from Fig. 2, because the material 6 and 7 extends well below the surface of the carrier, the slide is practically free of parallax.

By the terms "bond" or "integrate" I mean the material 6 and/or 7 and the carrier or body 5 are united by the material 6 and/or 7 altering the surface of carrier so that the material may migrate below this altered surface, which is also, of course, an uncovered face or surface of the slide, and form a part of the carrier body extending from above the altered surface and into the body of the carrier. Because the material 6 or 7 extends into the carrier and is thus united thereto as stated, the material will not be apt to chip, peel, craze, crack or creep, nor will it rub off the carrier as a surface coating would be apt to do.

Various changes may be made to the form of the invention herein shown and described without departing from the spirit of the invention or scope of the claims.

I claim:

1. A projection slide including a substantially transparent self-sustaining flexible and non-fragile sheet, and indicia-forming material integrated therewith, said material including, as essential ingredients, a component selected from the group consisting of ethylene glycol monobutyl ether and butyl lactate, and castor oil.

2. A projection slide including a substantially transparent self-sustaining flexible and non-fragile sheet, and border frame-forming material integrated therewith, said material including, as essential ingredients, a component selected from the group consisting of ethylene glycol monobutyl ether and butyl lactate, and castor oil, extending to an edge of said sheet.

3. A projection slide including a substantially transparent carrier of cellulose acetobutyrate, and indicia-forming material integrated therewith, said material comprising a mixture of ethylene glycol monobutyl ether, castor oil and coloring matter.

4. A composition of matter adapted for integrating with a carrier of cellulose acetobutyrate to provide indicia or a border frame for the carrier, said composition of matter including a component selected from the group consisting of ethylene glycol monobutyl ether and butyl lactate, and castor oil.

5. A composition of matter adapted for integrating with a carrier of cellulose acetobutyrate to provide bubble free indicia or a border frame for the carrier, said composition of matter comprising ethylene glycol monobutyl ether, castor oil, coloring matter and a solvent for a portion of said cellulose acetobutyrate as essential ingredients.

6. A composition of matter adapted for integrating with a carrier of cellulose acetobutyrate to provide bubble free indicia or a border frame for the carrier, said composition of matter consisting of ethylene glycol monobutyl ether 10 ounces, castor oil 15 drops, coloring matter ¼ pound and a solvent for a portion of said cellulose acetobutyrate 2 ounces, said weights being avoirdupois weight.

7. A projection slide including a substantially transparent self-sustaining flexible and non-fragile sheet, and indicia-forming material integrated therewith and extending above and below one of the faces of said slide, said material including, as essential ingredients, a component selected from the group consisting of ethylene glycol monobutyl ether and butyl lactate, and castor oil.

8. A projection slide including a substantially transparent carrier of cellulose acetobutyrate, and indicia-forming material integrated therewith and extending above and below one of the faces of said slide, said material including butyl lactate, castor oil and a solvent for a portion of said cellulose acetobutyrate below said indicia-forming material.

References Cited in the file of this patent

UNITED STATES PATENTS

| Number | Name | Date |
|---|---|---|
| 2,120,673 | Meadows | June 14, 1938 |
| 2,143,141 | Cooley | Jan. 10, 1938 |
| 2,183,948 | Wallach | Dec. 19, 1939 |
| 2,511,552 | Stuempges | June 13, 1950 |
| 2,622,991 | Sturm | Dec. 23, 1952 |
| 2,662,033 | Andrew | Dec. 8, 1953 |
| 2,748,017 | Hunt | May 29, 1956 |